(12) United States Patent
Fan et al.

(10) Patent No.: US 8,649,335 B2
(45) Date of Patent: Feb. 11, 2014

(54) SERVICE MODELS FOR ROAMING MOBILE DEVICE

(75) Inventors: James Fan, San Ramon, CA (US);
David Chen, Fremont, CA (US);
Richard Kuo, Mountain View, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 745 days.

(21) Appl. No.: 12/628,946

(22) Filed: Dec. 1, 2009

(65) Prior Publication Data
US 2011/0130117 A1    Jun. 2, 2011

(51) Int. Cl.
*H04W 4/00*    (2009.01)

(52) U.S. Cl.
USPC ........................................................ 370/329

(58) Field of Classification Search
USPC ........................................................ 370/329
See application file for complete search history.

(56) References Cited

U.S. PATENT DOCUMENTS

| | | |
|---|---|---|
| 2002/0124065 A1 | 9/2002 | Barritt et al. |
| 2005/0192007 A1* | 9/2005 | Kumar et al. ................. 455/433 |
| 2007/0072641 A1 | 3/2007 | Willey |
| 2008/0090614 A1* | 4/2008 | Sicher et al. .................. 455/558 |
| 2010/0261502 A1 | 10/2010 | Martin-Cocher et al. |
| 2010/0311444 A1* | 12/2010 | Shi et al. ....................... 455/466 |

OTHER PUBLICATIONS

U.S. Appl. No. 12/628,993, entitled "Service Models for Roaming Mobile Device", filed Dec. 1, 2009 (Fan et al.).

* cited by examiner

*Primary Examiner* — Derrick Ferris
*Assistant Examiner* — Farhad Ali
(74) *Attorney, Agent, or Firm* — Parks IP Law LLC; Jennifer P. Medlin, Esq.

(57) ABSTRACT

A method for providing cellular access to a mobile device when the mobile device is out of a home network operated by a home wireless service provider that has no pre-arranged roaming agreements with any foreign wireless service provider in a location of the mobile device, The method includes implementing an intelligent Mobile Device Access Network Manager (iMDANM) application on a Universal Integrated Circuit Card (UICC). The iMDANM application being configured to allow a foreign wireless service provider to lease a portion of the UICC from the home wireless service provider to provision service credentials to the leased portion of the UICC, thereby providing the mobile device access to a foreign network operated by the foreign wireless service provider.

19 Claims, 9 Drawing Sheets

SERVICE MODELS FOR ROAMING MOBILE DEVICE

TECHNICAL FIELD

The present disclosure relates generally to roaming services and, more particularly, to service models for roaming mobile devices.

BACKGROUND

Wireless Service Providers (WSPs) offer various wireless service models to their subscribers. Many of these service models are dictated by regulations. For example, most WSPs in the United States offer service contracts with preconfigured roaming agreements and mobile devices that are locked. A locked mobile device prevents a subscriber from using the mobile device on other WSP networks.

Most mobile devices sold in the United States are pre-locked by the WSP. Nearly all WSPs subsidize the price of mobile devices in exchange for voice/data service contracts. Recently, some unlocked mobile devices, such as smartphones, are being sold for a much higher price without the subsidy. Many subscribers are willing to pay a premium price for an unlocked device, while others choose, as is more commonly the case, to unlock their device through the use of software tools, without the permission of the WSP. In response to the use of such software tools, more WSPs are offering subscribers the option to unlock their device, often for a fee, even though it means a subscriber can use that phone with another WSP. Some WSPs unlock devices after a subscriber's account has been active for a specific time period or the service contract term has been fulfilled. Other WSPs may offer to unlock the subscriber's mobile device while a service contract is active, depending upon the details of the subscriber's service contract.

One method WSPs use to unlock mobile devices is sending an unlock code with step-by-step instructions to the subscriber's mobile device. Another method WSPs use to unlock mobile devices is asking a subscriber to send his or her mobile device to the WSP for unlocking. Yet another method WSPs use to unlock mobile devices is providing kiosks that are configured with software to unlock the mobile device.

The present device locking model that many WSPs use can cause major inconveniences when the subscriber travels to foreign countries and, particularly, foreign countries in which the subscriber's home WSP has no roaming agreements with a foreign WSP. Under these circumstances, the only choice for the subscriber is to purchase a prepaid mobile device or prepaid SIM (Subscriber Identity Module) in the foreign country. This creates a few potential problems. For example, the subscriber can no longer invoke all services to which he or she is subscribed in their home wireless network, and the subscriber is encumbered with having to carry multiple mobile devices with cellular access being available only through the prepaid mobile device.

An advantage to the subscriber of having an unlocked mobile device is the ability for the unlocked mobile device to be used in countries other than the subscriber's home country, often at a fraction of the cost of buying a local prepaid SIM card. Otherwise, the subscriber is left paying high international roaming fees.

In 2G networks, the SIM card and SIM application are bound together, so that the common phrase "SIM Card" is a physical circuit card with the SIM application, In 3G networks, a UICC (Universal Integrated Circuit Card) is used. A UICC ensures the integrity and security of a subscriber's personal data. The memory capacity of a typical UICC is a few hundred kilobytes, although the memory capacity of UICCs is increasing due to the number of applications that need to be stored in the UICC. For example, a UICC may contain a USIM (Universal SIM) application for UMTS (Universal Mobile Telecommunications System) networks, a CDMA (Code Division Multiple Access) SIM (CSIM) for CDMA networks, and a SIM application for GSM (Global System for Mobile communications) networks, making it possible for the same UICC to provide access to different 2G and/or 3G networks.

When a subscriber is in a foreign country and attempts to make a call, the subscriber has a few options. If there is no roaming agreement established between the local WSP(s) and the home WSP, the subscriber is unable to use his or her mobile device to make the call. In this case, the subscriber can purchase a prepaid mobile device with a new SIM card that is configured to provide cellular access in the foreign country. This scenario presents a few problems. If the country or the area the subscriber is visiting is unsafe, the subscriber may not want to venture out in public to purchase a new mobile device for worry of their personal safety. Also, it is inconvenient for the subscriber to purchase another mobile device to be used only locally in the foreign country. If the subscriber is staying for a short time in a foreign country, buying a locally-compatible mobile device may not be practical, financially or otherwise. Likewise, if the subscriber is traveling to several foreign countries, and stopping in each country for only a few days or perhaps even longer, buying a locally-compatible mobile device for each country may not be a feasible communications solution.

If, however, there is a roaming agreement between the local service provider and the home WSP, the mobile device will permit the subscriber to make the call and the bill will be settled between the two WSPs. Prior to the roaming service being authorized, the subscriber will be authenticated by the home WSP. For prepaid roaming agreements, the call-related data must be exchanged in real-time between the local WSP and the home WSP by using a special CAMEL (Customized Applications for Mobile networks Enhanced Logic)-based platform, to prevent the balance of the roaming subscriber's account from becoming overdrawn.

SUMMARY

Various aspects of the present disclosure address the aforementioned problems that arise when a mobile device is out of a home WSP's coverage area and no roaming partners are available in the mobile device's location. These solutions provide benefits to home WSPs, subscribers, and third party participating entities.

According to one embodiment of the present disclosure, when a mobile device is out of the home WSP's coverage area and no roaming partners are available in the mobile device's location, the subscriber is provided the option to establish a temporary lease agreement on the UICC of the subscriber's mobile device with a foreign WSP. According to another embodiment, under the same conditions, the subscriber is provided the option to establish a temporary roaming agreement with the foreign WSP. According to another embodiment, under the same conditions, the subscriber is provided the option to unlock their mobile device temporarily and use a pay-as-you-go service plan with the foreign WSP.

Home WSPs can benefit from the disclosed solutions by avoiding mobile devices from being illegally unlocked, resulting in a loss of revenue. Another benefit is that WSPs are able to allow subscribers to continue to use the same mobile device while the mobile device is in a location where no previous roaming agreement is available. This results in an improved subscriber experience and higher subscriber retention. WSPs may also benefit from higher revenues, in part by offering services that may persuade subscribers from switching to a foreign WSP when the subscriber is located in a location serviced by the foreign WSP.

Subscribers can benefit from the disclosed solutions by enjoying greater convenience in no longer needing to purchase another mobile device in a region where no roaming agreement is available. Subscribers can also benefit from receiving the same service features as in the subscriber's home region in a region where no roaming is available. Another benefit to subscribers is having the capability to negotiate charging policies. Yet another benefit to subscribers is having the option to agree to a temporary roaming agreement with a foreign WSP via a third party entity, thereby eliminating the need for the subscriber to visit a retailer in an unsafe location. Similar benefits are provided by a temporary lease agreement. Still another benefit to subscribers is having the option to agree to a temporary unlocking agreement for a pay-as-you-go service plan that is provisioned over-the-air.

Third party entities, such as online clearing house or negotiation service providers, for example, can benefit from the disclosed solutions by receiving additional service and revenue opportunities from WSPs.

DETAILED DESCRIPTION

As required, detailed embodiments of the present disclosure are provided herein. The disclosed embodiments are merely examples that may be embodied in various and alternative forms, and combinations thereof. As used herein, for example, exemplary, and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the devices and methods of the present disclosure. Therefore, specific structural and functional details disclosed herein are not to be interpreted as limiting, but merely as a basis for the claims and as a representative basis for teaching one skilled in the art to variously employ the present disclosure.

The systems and methods of the present disclosure may be implemented in wireless networks that use exemplary telecommunications standards, such as Global System for Mobile communications (GSM) and a Universal Mobile Telecommunications System (UMTS). It should be understood, however, that the systems and methods may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G, 3G, and above (e.g., 4G and beyond) technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data bearers.

While the methods described herein may, at times, be described in a general context of computer-executable instructions, the methods of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Figure 1:
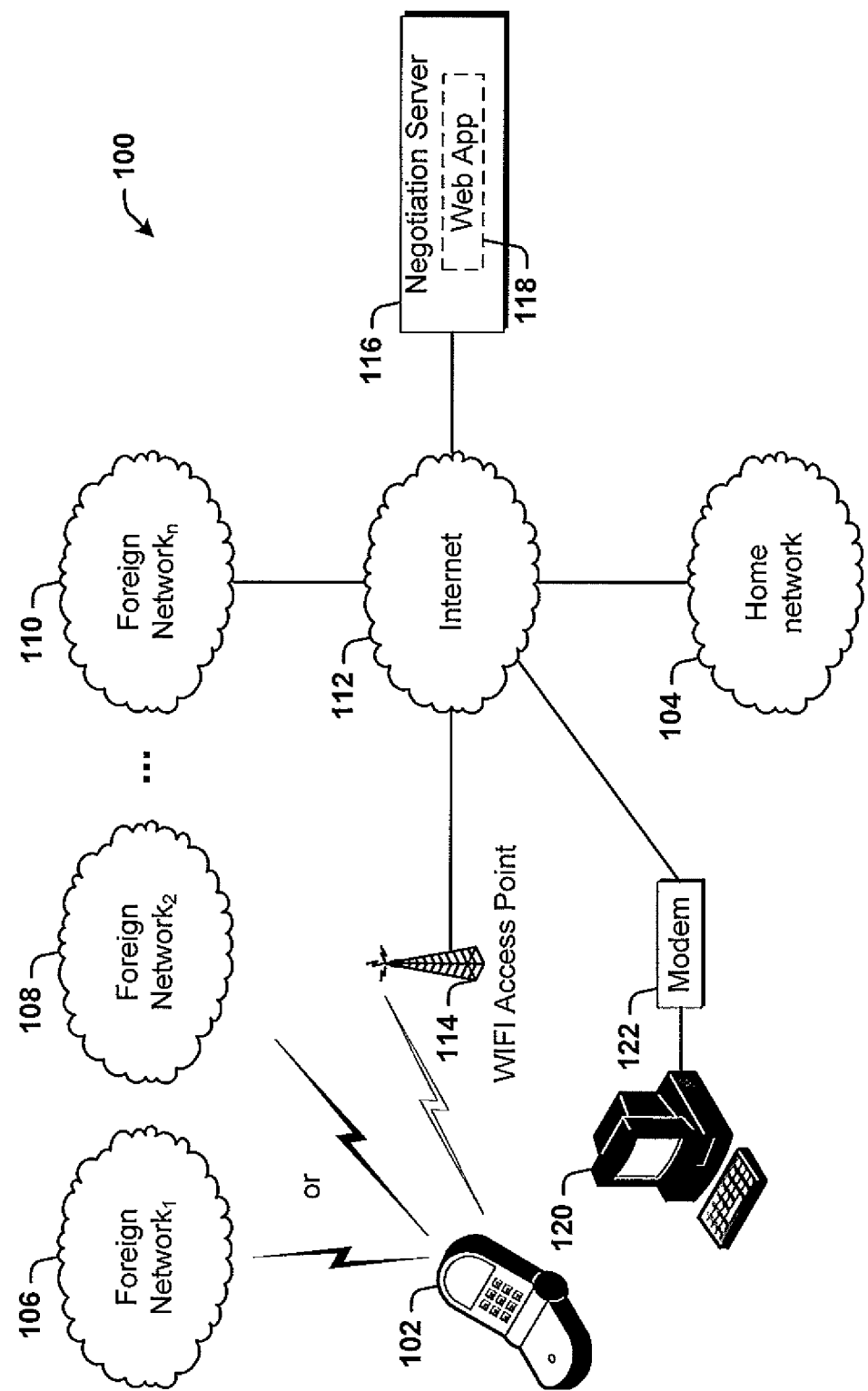
FIG. 1. illustrates certain elements of a cellular communications system.

Referring now to FIG. 1, a cellular communications system 100 for providing cellular service to a roaming mobile device 102 is illustrated. The roaming mobile device 102 is configured to communicate with a home network 104 provided by a home WSP (Wireless Service Provider). When the mobile device 102 travels outside of the home network 104, the mobile device 102 detects all foreign networks 106, 108, 110 (denoted Foreign Network$_1$, . . . Foreign Network$_N$, where N is a positive integer) provided by one or more foreign WSPs. A foreign network may be in another country, requiring international roaming, or may simply be a network operated by another WSP in the same country. Moreover, a foreign WSP may operate networks in another country or in the same country.

At present, when subscribers travel to a different country with their mobile device, the subscriber's home network may not have coverage in the visited country. WSPs often establish roaming agreements with foreign WSPs so that their subscribers are still able to make and receive calls while roaming onto another WSP's network (foreign network), in the visited country. When a subscriber powers on their mobile device in the visited country, the mobile device receives radio signals from one or more foreign network operating in that country. After one of the foreign networks is selected by the mobile device, the corresponding local WSP authenticates the subscriber's mobile device with the subscriber's home WSP, for example, including determining whether the subscriber is a valid subscriber with roaming capability enabled for their account. If the home WSP responds with a positive authentication, the subscriber is permitted to use his or her mobile device on the local WSP network. For billing, the local WSP will keep a record of all calls and other activity from the subscriber's mobile device and send the record along with the corresponding charges to the subscriber's home WSP. The home WSP aggregates these charges and bills them to the subscriber.

At present, when a subscriber is out of the home network 104 and no roaming partner is available in the visited country or location, the subscriber is required to purchase a prepaid mobile device from a retailer that offers a foreign WSP's service in order to make and receive calls. The embodiments disclosed herein eliminate this problem and provide methods for the subscriber to use their mobile device to communicate on a foreign network 106, 108, 110 without the foreign network 106, 108, 110 being a roaming partner network of the subscriber's home WSP.

According to one embodiment of the present disclosure, when a mobile device is out of the home WSP's coverage area and no roaming partners are available in the mobile device's location, the subscriber is provided the option to establish a temporary lease agreement with a local WSP. According to another embodiment, under the same conditions, the subscriber is provided the option to unlock their mobile device temporarily and use a pay-as-you-go service plan with the local WSP. According to still another embodiment, under the same conditions, the subscriber is provided the option to establish a temporary roaming agreement with the local WSP.

In the aforementioned embodiments, the mobile device 102 connects to the Internet 112 via a WIFI access point 114, if the mobile device 102 is configured with a WIFI transceiver and a WIFI access point is available. The WIFI access point may provide wireless Internet access by using one or more IEEE 802.11x protocols. The WIFI access point may provide wireless Internet access for free or for a charge. The WIFI access point may provide wireless Internet access with or without security mechanisms, such as, WPA, WPA2, WEP, combinations thereof, or the like.

If the mobile device 102 is not configured with a WIFI transceiver or no WIFI access is available, the subscriber could use a computer 120 to access the Internet 112 via a modem 122. The modem 122 may be any type including, but not limited to, cable modem, DSL modem, dial-up modem, or the like. Moreover, while WIFI access is specifically mentioned here and later in some of the figures, WIFI access is not meant to limit a secondary communications capability of the mobile device 102. Alternatively, the mobile device 102 may include a WIMAX transceiver or other non-cellular technology transceiver by which the mobile device 102 can access the Internet 112.

As also shown in FIG. 1, the cellular communications system 100 includes a negotiation server 116. The negotiation system 116 is accessible via a WIFI-enabled mobile device (in one embodiment, the mobile device 102) or the computer 120 through a web application 118 associated with the negotiation server 116. In some embodiments, the negotiation server 116 is a third party server, such as one operated by a third party clearing house. The negotiation server 116 searches for available foreign networks, selects a viable foreign network (of the foreign networks 106, 108, 110) for providing cellular access to the mobile device 102, negotiates a temporary roaming agreement or a temporary lease agreement between the WSPs of a foreign network and the home network 104, and provides confirmation details for the agreement to the subscriber. The negotiation server 116 is described in greater detail below with reference to FIGS. 3 and 6.

The web application 118 is designed according to the needs of the entity operating the negotiation server 116. The web application 118 is accessed via a web browser installed on the mobile device 102 or the computer 120. The web application 118 may be hosted in a browser-controlled environment (e.g., a Java applet) or coded in a browser-supported language (e.g., JavaScript possibly combined with a markup language such as HTML) and reliant on the web browser to render the web application 118 executable.

In some embodiments, the mobile device 102 is configured with an iMDANM (intelligent Mobile Device Access Network Manager), which is described in greater detail with reference to FIG. 7 and briefly introduced here. The iMDANM is resident on the mobile device 102 in a memory or in a UICC (Universal Integrated Circuit Card). In some embodiments, the iMDANM is pre-loaded by a WSP.

When a service contract is executed with a WSP, the WSP sends contractual information, including subscriber information, charging rules, and roaming information to the iMDANM. Alternatively, the iMDANM will retrieve the contractual information from the WSP's web portal, or over-the-air, and store it locally in the mobile device 102. In some embodiments, the iMDANM will periodically update locally-stored information whenever the subscriber powers on the mobile device 102. In some embodiments, the iMDANM also retrieves an unlocking code from the WSP. The unlocking code is used in temporary unlocking methods that are described in greater detail with particular reference to FIG. 4. In some embodiments, the iMDANM also retrieves a locking code from the WSP that is used to re-lock the mobile device 102 upon expiration of a temporary unlocking agreement. Alternatively, the locking code is pre-programmed into the iMDANM or another portion of the UICC. In some embodiments, the locking and/or unlocking code is encrypted to prevent misuse.

Figure 2:
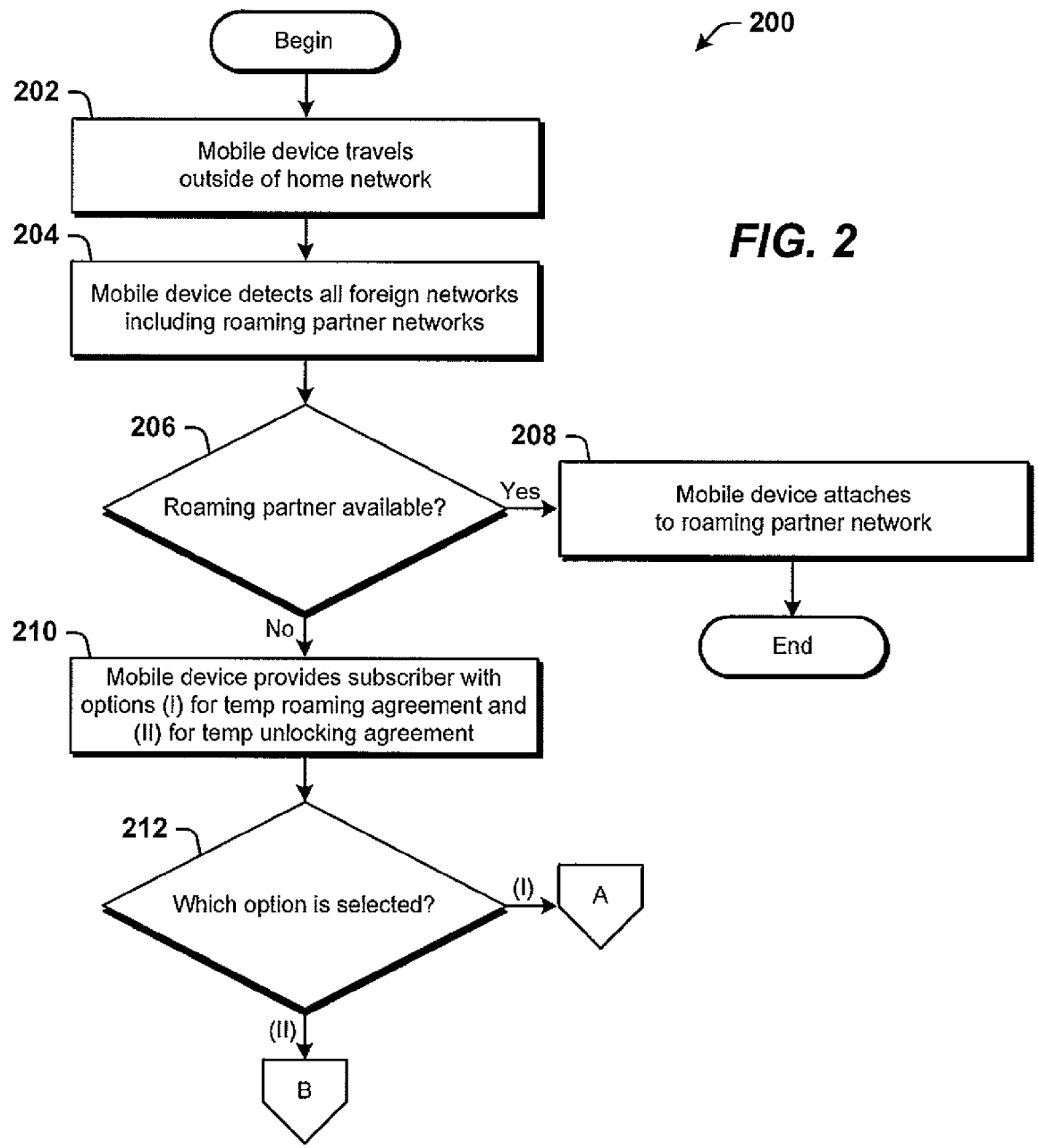
FIG. 2 illustrates an exemplary method for providing a subscriber the option to engage in a temporary roaming agreement or a temporary mobile device unlocking agreement for a roaming mobile device.

FIG. 2 illustrates an exemplary method 200 for providing a subscriber options to engage in a temporary roaming agreement or a temporary mobile device unlocking agreement when the subscriber is outside of their home network. It should be understood that the steps of the method 200 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 200 can be ended at any time. In certain embodiments, some or all steps of this process, and/or substantially equivalent steps can be performed by execution of computer-readable instructions stored or included on a computer-readable medium, such as a memory of the mobile device 102.

The method 200 begins and flow is to block 202, whereat the mobile device 102 travels outside the home network 104 and into an area serviced by one or more foreign networks 110 operated by one or more foreign WSPs. At block 204, the mobile device 102 detects all foreign networks including any roaming partner networks.

If, at block 206, a roaming partner network is determined to be available, flow proceeds to block 208, whereat the mobile device 102 attaches to the available roaming partner network and the method 200 ends. If, however, no roaming partner network is available, as determined at block 206, flow proceeds to block 210, whereat the mobile device 102 provides the subscriber with options to (I) gain access to a foreign network 110 using a temporary roaming agreement or (II) gain access to a foreign network using a temporary unlocking agreement. In some embodiments, the mobile device 102 presents these options to the subscriber on a display of the mobile device 102 or audibly through a speaker of the mobile device 102. An exemplary mobile device, such as the mobile device 102, and components thereof is described in detail below with reference to FIG. 8.

At block 212, the mobile device 102 receives a selection from the subscriber via a user interface of the mobile device 102 and responds accordingly. If option (I) is selected, flow is to the method 300 illustrated in FIG. 3. If option (II) is selected, flow is to the method 400 illustrated in FIG. 4.

Figure 3:
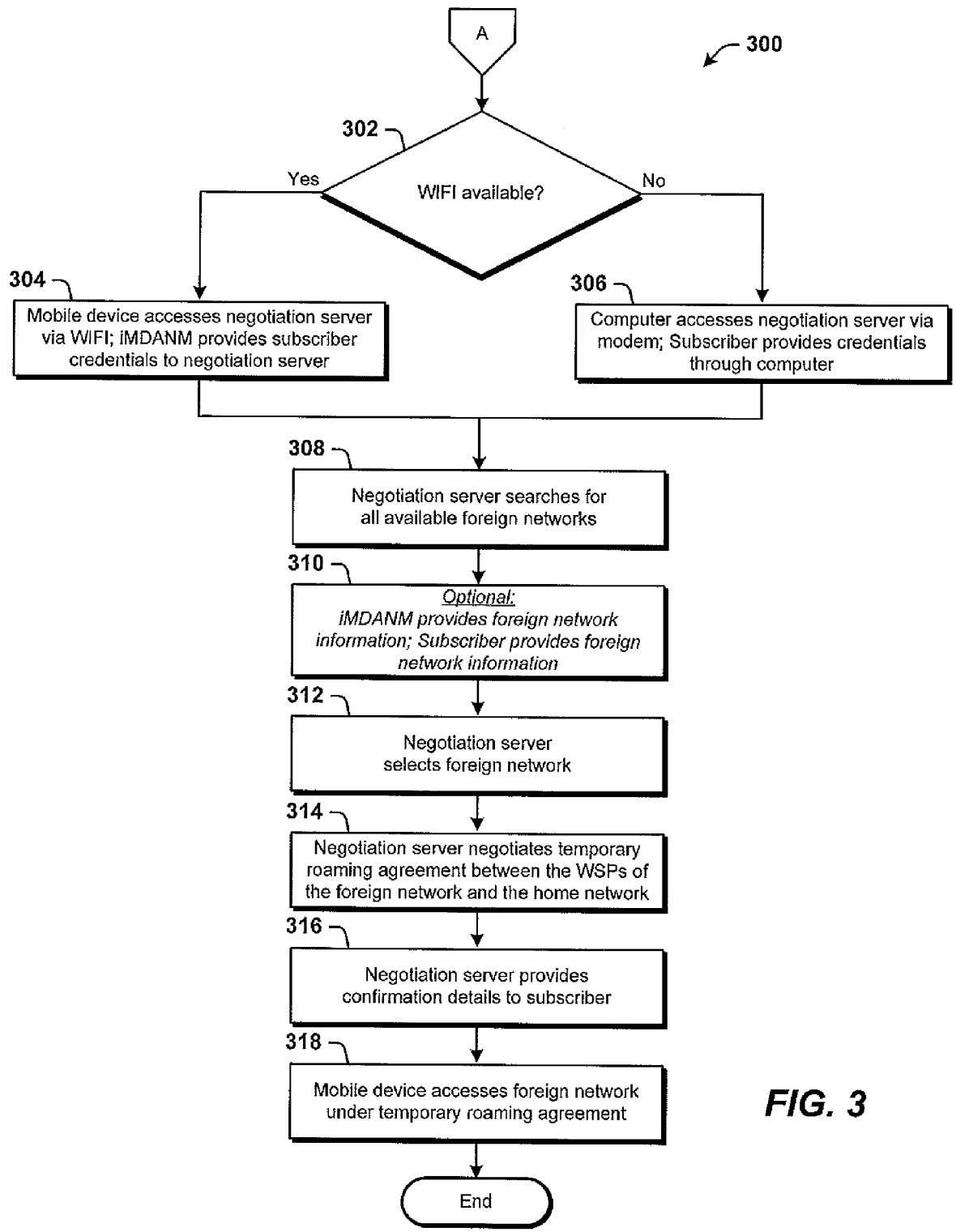
FIG. 3 illustrates an exemplary method for negotiating a temporary roaming agreement.

FIG. 3 illustrates an exemplary method 300 for negotiating a temporary roaming agreement upon selection of option (I) at block 212 of FIG. 2. It should be understood that the steps of the method 300 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. For example, the method 300 illustrates steps that can be performed without the steps illustrated in method 200. It should also be understood that the illustrated method 300 can be ended at any time. In certain embodiments, some or all steps of this process, and/or substantially equivalent steps can be performed by execution of computer-readable instructions stored or included on a computer-readable medium, such as, in part or in full, a memory of the mobile device 102 and/or a memory of the negotiation server 116, where appropriate.

The method 300 begins and flow is to determination block 302, whereat it is determined whether WIFI is available to the mobile device 102. If WIFI is available, flow is to block 304, whereat the mobile device 102 accesses the negotiation server 116 so that the iMDANM in the mobile device 102 can provide subscriber credentials to the negotiation server 116. Otherwise, flow is to block 306, whereat the subscriber uses the computer 120 to access the negotiation server 116 to provide the credentials. WIFI may be unavailable, for example, due to the mobile device 102 not being configured to communicate via WIFI (e.g., if the mobile device 102 lacks a WIFI transceiver or required software), due to the unavailability of a WIFI network, or due to the unavailability of a WIFI network that meets the subscriber's needs (e.g., cost, proximity).

In some embodiments, the negotiation server 116 requires one or more credentials and authenticates the credentials prior to processing a request to negotiate a temporary roaming agreement. The negotiation server 116 authenticates the credentials with the subscriber's home WSP. Subscriber credentials include, but are not limited to, home WSP information, telephone number, IMEI (International Mobile Equipment Identity), current location of the mobile device 102 (e.g., zip code, area code, country code, latitude/longitude coordinates, city, state, province, region, country), duration of the temporary roaming agreement (e.g., duration requested by the subscriber, duration requested by the home WSP), credit amount agreed upon between the subscriber and the home WSP (e.g., as part of a service contract; credit is designated only for a temporary roaming agreement or a combination of services including the temporary roaming agreement; credit is open for any service, overage, or fee), and a maximum allotted credit amount for an invoked service including, but not limited to, services rendered under a temporary roaming agreement to define a secured charging policy.

The negotiation server 116 receives the subscriber credentials and, at block 308, searches for all available foreign networks 110. As disclosed at block 204 in FIG. 2, the mobile device 102 is in some embodiments able to detect all foreign networks operating in the visited location. Accordingly, in those embodiments, at block 310, the negotiation server 116 can request the mobile device 102 via the iMDANM or the subscriber via the computer 120 to provide foreign network information, including network identification information, such as name and technology type (e.g., GSM or UMTS). The negotiation server 116 may request this information instead of conducting the search at block 308 or in addition to conducting the search. In some embodiments, the iMDANM or the subscriber provides foreign network information at will and not in response to a request from the negotiation server 116. In some embodiments, the iMDANM is configured to automatically provide any foreign network information found at block 204, for example, when providing subscriber credentials to the negotiation server 116.

At block 312, the negotiation server 116 finds and selects a foreign network 110. At block 314, the negotiation server 116 negotiates a temporary roaming agreement between the home WSP and the foreign WSP operating the selected foreign network 110. In some embodiments, the negotiation process includes the negotiation server 116 providing any subscriber requested charging policies to the home WSP, which direct its charging system (e.g., by way of a policy charging rule function) to enable dynamic charging rule validation for each invoked service. In some embodiments, a subscriber account is pre-billed by the home WSP to cover roaming fees and other usage charges that the home WSP may be billed for by the foreign WSP. Alternatively, the subscriber's credit amount (e.g., an eWallet) is debited to cover any roaming fee and other usage charges. In some embodiments, the subscriber is provided the option to change the charging agreement and policies after temporary roaming has been initially granted.

At block 316, the negotiation server 116 provides confirmation details to the subscriber by way of an SMS (Short Messaging Service) message, USSD (Unstructured Supplementary Service Data) message, email, or other electronic communication. It is contemplated that the negotiation server 116 may alternatively or additionally send a physical copy of the confirmation details to the subscriber's address or to the home WSP, which may forward the physical copy to the subscriber's address. In some embodiments, the confirmation details include a confirmation code, the pre-billed amount or the debited amount depending upon the payment method used, a password or other security mechanism the subscriber needs to access the foreign network 110, and the duration of the established temporary roaming agreement. The confirmation code may be used by the subscriber to retrieve additional details about the transaction and/or roaming agreement through a customer service portal, such as a website or customer service number. Alternatively, no confirmation details are sent to the subscriber.

At block 318, the mobile device 102 accesses the foreign network 110 under the temporary roaming agreement. In some embodiments, the mobile device 102 is no longer capable of accessing the foreign network 110 after the temporary roaming agreement has expired. In some embodiments, the subscriber is warned by the foreign network 110 of the expiration and may be prompted to extend the temporary roaming agreement or allow the agreement to expire. In still other embodiments, the subscriber is provided the option to cancel or force early expiration of the temporary roaming agreement. In these embodiments, the subscriber may or may not be refunded any fees for the remaining portion of the agreement based upon the charging policies established for the subscriber. The method 300 ends.

Figure 4:
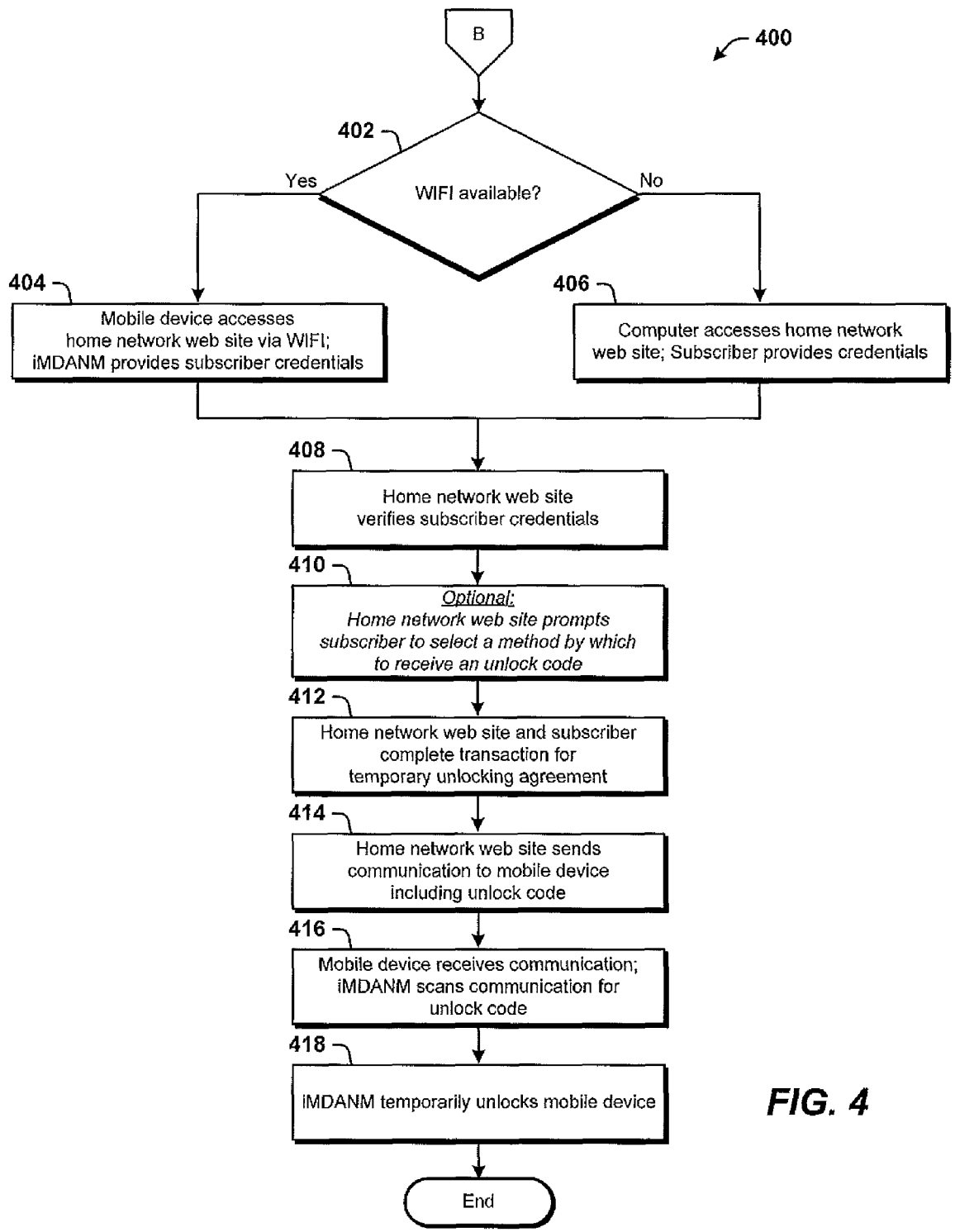
FIG. 4 illustrates an exemplary method for negotiating a temporary mobile device unlocking agreement.

FIG. 4 illustrates an exemplary method for negotiating a temporary mobile device unlocking agreement upon selection of option (II) at block 212 of FIG. 2. It should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. For example, the method 400 illustrates steps that can be performed without the steps illustrated in method 200. It should also be understood that the illustrated method 400 can be ended at any time. In certain embodiments, some or all steps of this process, and/or substantially equivalent steps can be performed by execution of computer-readable instructions stored or included on a computer-readable medium, such as, in part or in full, a memory of the mobile device 102 and/or a memory of the negotiation server 116, where appropriate.

The method 400 begins and flow is to determination block 402, whereat it is determined whether WIFI is available to the mobile device 102. If WIFI is available, flow is to block 404, whereat the mobile device 102 accesses a web site of the home network WSP so that the iMDANM in the mobile device 102 can provide subscriber credentials to the web site. Otherwise, flow is to block 406, whereat the subscriber uses the computer 120 to access the web site to provide the credentials. WIFI may be unavailable, for example, due to the mobile device 102 not being configured to communicate via WIFI (e.g., if the mobile device 102 lacks a WIFI transceiver or the required software), due to the unavailability of a WIFI network, or due to the unavailability of a WIFI network that meets the subscriber's needs (e.g., cost, proximity).

In some embodiments, the web site requires one or more subscriber credentials. Subscriber credentials include, but are not limited to, home WSP information, telephone number, IMEI (International Mobile Equipment Identity), current location of the mobile device 102 (e.g., zip code, area code, country code, latitude/longitude coordinates, city, state, province, region, country), and duration of the temporary unlocking agreement (e.g., duration requested by the subscriber, duration requested by the home WSP). At block 408, the web site verifies the subscriber credentials.

At block 410, the web site optionally prompts the subscriber to select a method by which to receive an unlock code. The web site may also optionally prompt the subscriber for any subscriber credentials not received from the iMDANM or entered by the subscriber through the computer 120. In some embodiments, an email including an encrypted unlocking code is sent to the subscriber email account. In this embodiment, the iMDANM is configured to decrypt the encrypted unlocking code after it is received at the mobile device 102. In some embodiments, the iMDANM is configured to scan a received email for the unlocking code without further subscriber interaction. In other embodiments, the subscriber must manually enter the unlocking code.

In some embodiments, the email includes a two-dimensional barcode that, when read by a barcode reader, reveals the unlocking code. In this embodiment, the subscriber accesses the email through the computer 120 or another device with email access and uses a built-in camera on the mobile device 102 and barcode reader software installed on the mobile device 102 to scan the barcode image to retrieve the unlocking code. In other embodiments, the mobile device 102 communicates with the computer 120 or another device with email access via USB (Universal Serial Bus), IEEE 1394 (Firewire), BLUETOOTH, IEEE 802.3, IEEE 802.11x, RFID (Radio Frequency Identification), NFC (Near-Field Communication), proprietary connection, combinations thereof, or the like to receive the unlocking code.

At block 412, the web site and subscriber complete a transaction for the temporary unlocking agreement. The web site requests the subscriber to select a payment method if one has not already been pre-selected, for example, in previous agreements to use the subscriber's eWallet or other electronic payment method, such billing the subscriber's wireless account, credit card, or debit card. In some embodiments, regardless of the selected payment method, the web site charges the subscriber to cover an unlocking fee and security deposit for the temporary unlocking agreement and grants the temporary unlocking agreement. In some embodiments, temporary unlocking agreements are built into a subscriber's service contract and, as such, the home WSP does not charge any additional fees. In other embodiments, temporary unlocking agreements are provided free-of-charge for all subscribers or for subscribers meeting a specific qualification requirement or set of qualification requirements, such as account standing, time active, and/or whether the subscriber is subscribed to or willing to subscribe to additional services provided by the home WSP or its affiliates.

At block 414, the web site sends a communication including the unlocking code to the mobile device 102 via any of the aforementioned methods. At block 416, the mobile device 102 receives the communication to retrieve the unlocking code. At block 418, the iMDANM temporarily unlocks the mobile device 102. After the successful temporary unlocking of the mobile device 102, the subscriber can go to a local wireless store and purchase a pre-paid SIM card to replace the one in the mobile device 102 to access the foreign network of choice. The method 400 ends.

In some embodiments, the mobile device 102 is no longer capable of accessing the foreign network 110 after the temporary unlocking agreement has expired. In other embodiments, the subscriber is warned by the foreign network 110 or by the iMDANM of the expiration and may be prompted to extend the temporary unlocking agreement or allow the agreement to expire. In still other embodiments, the subscriber is provided the option to cancel or force early expiration of the temporary unlocking agreement. In these embodiments, the subscriber may or may not be refunded any fees for the remaining portion of the agreement based upon the charging policies established for the subscriber. In some embodiments, after the temporary unlocking agreement expires or is otherwise canceled, the iMDANM uses the previously stored code to lock the mobile device 102.

Figure 5:
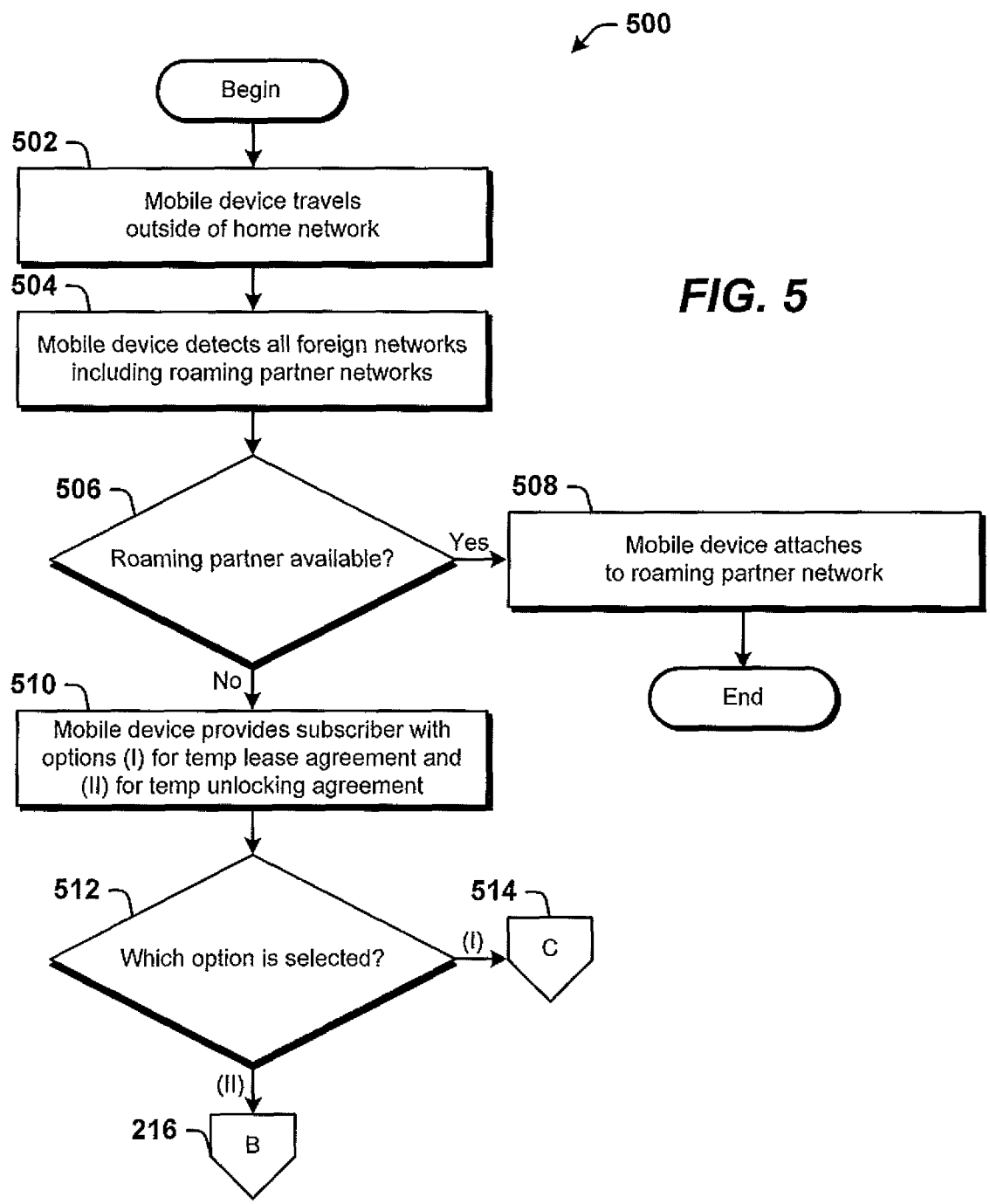
FIG. 5 illustrates an exemplary method for providing a subscriber the option to engage in a temporary lease agreement or a temporary mobile device unlocking agreement for a roaming mobile device.

FIG. 5 illustrates an exemplary method 500 for providing a subscriber the option to engage in a temporary lease agreement or a temporary mobile device unlocking agreement when the subscriber is outside of their home network. It should be understood that the steps of the method 500 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. In certain embodiments, some or all steps of this process, and/or substantially equivalent steps can be performed by execution of computer-readable instructions stored or included on a computer-readable medium, such as a memory of the mobile device 102.

The method 500 begins and flow is to block 502, whereat the mobile device 102 travels outside the home network 104 and into an area serviced by one or more foreign networks 110 operated by one or more foreign WSPs. At block 504, the mobile device 102 detects all foreign networks including any roaming partner networks.

If, at block 506, a roaming partner network is determined to be available, flow proceeds to block 508, whereat the mobile device 102 attaches to the available roaming partner network and the method 500 ends. If, however, no roaming partner network is available, as determined at block 506, flow proceeds to block 510, whereat the mobile device 102 provides the subscriber with options to (I) gain access to a foreign network 110 using a temporary lease agreement or (II) gain access to a foreign network using a temporary unlocking agreement. In some embodiments, the mobile device 102 presents these options to the subscriber on a display of the mobile device 102 or audibly through a speaker of the mobile device 102. An exemplary mobile device, such as the mobile device 102, and components thereof is described in detail below with reference to FIG. 8.

At block 512, the mobile device 102 receives a selection from the subscriber via a user interface of the mobile device 102 and responds accordingly. If option (I) is selected, flow is to FIG. 6 and the illustrated method 600, described below. If option (II) is selected, flow is to FIG. 4 and the illustrated method 400, described above.

Figure 6:
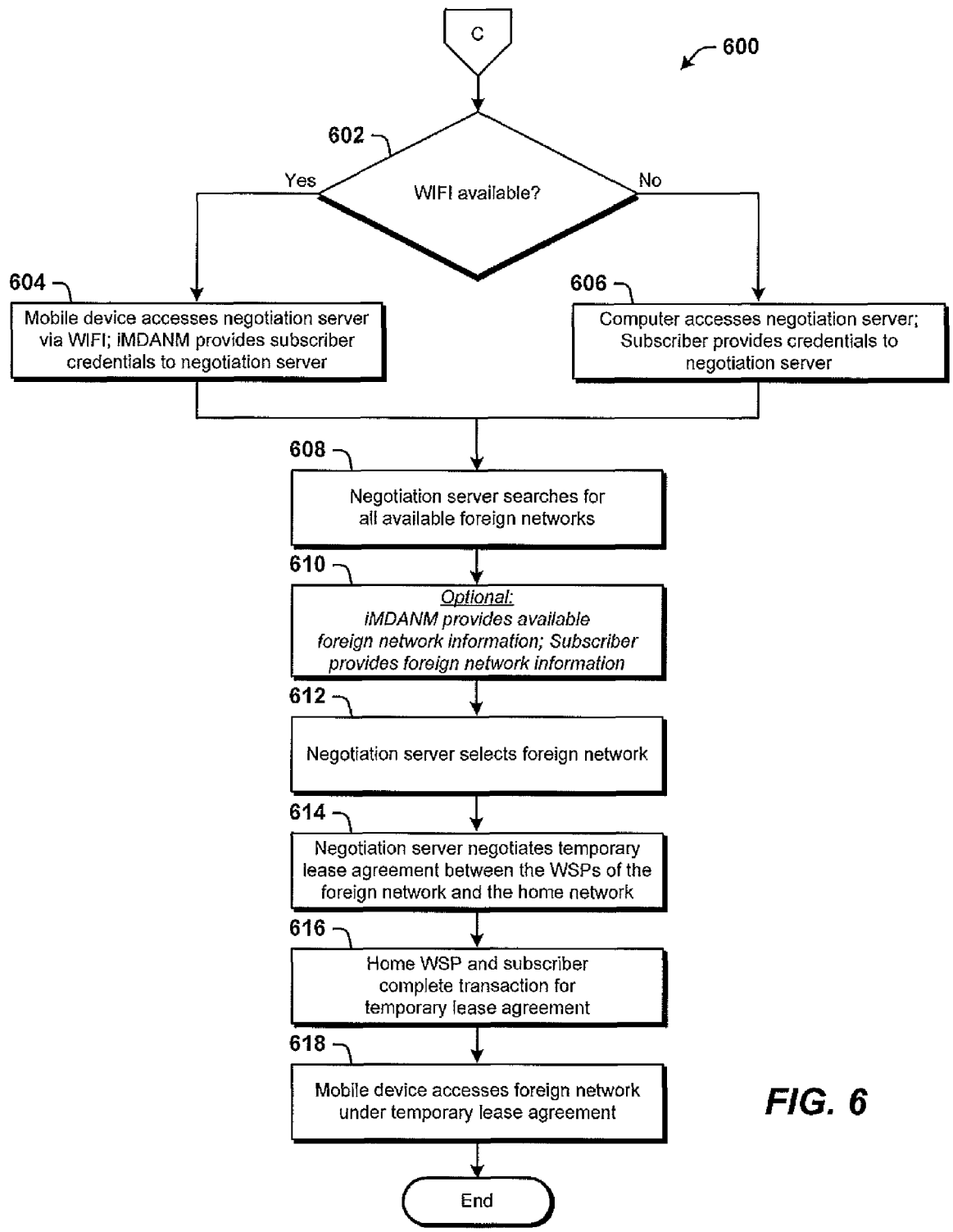
FIG. 6 illustrates an exemplary method for negotiating a temporary lease agreement.

FIG. 6 illustrates an exemplary method 600 for negotiating a temporary lease agreement upon selection of option (I) at block 512 of FIG. 5. It should be understood that the steps of the method 600 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. For example, the method 600 illustrates steps that can be performed without the steps illustrated in method 500. It should also be understood that the illustrated method 600 can be ended at any time. In certain embodiments, some or all steps of this process, and/or substantially equivalent steps can be performed by execution of computer-readable instructions stored or included on a computer-readable medium, such as, in part or in full, a memory of the mobile device 102 and/or a memory of the negotiation server 116, where appropriate.

The method 600 relates to an embodiment wherein the iMDANM includes a logical X-SIM application (X can be C, U, or any other notation) leasing model to allow a foreign WSP to provision pre-paid X-SIM card keys and attributes, as is customary for a regular SIM for that foreign WSP on the iMDANM of a roaming mobile device (e.g., the mobile device 102). In this service model, the home WSP that owns the UICC associated with the subscriber leases a memory portion of the UICC to the foreign WSP for secure provisioning of the foreign WSP's service credentials to the leased memory portion of the UICC. The iMDANM provides subscriber management functions via a software client installed on the mobile device 102 for allowing the subscriber to delete or add new WSPs. In some embodiments, the subscriber signs up for an NEC-based mobile payment credit card offered by the home WSP and a credit card provider, so the foreign WSP can charge the subscriber for using their network services, such as voice, messaging, and/or data service. The iMADNM software client provides a user interface that prompts the subscriber for his or her consent for the foreign WSP to charge their credit card. Other payment options, such as those disclosed above, are contemplated for use under this service model, as well.

The method 600 begins and flows to determination block 602, whereat it is determined whether WIFI is available to the mobile device 602. If WIFI is available, flow is to block 604, whereat the mobile device 102 accesses the negotiation server 116 such that the iMDANM in the mobile device 102 can provide subscriber credentials to the negotiation server 116. Otherwise, flow is to block 606, whereat the subscriber uses the computer 120 to access the negotiation server 116 to provide the credentials. WIFI may be unavailable, for example, due to the mobile device 102 not being configured to communicate via WIFI (e.g., if the mobile device 102 lacks a WIFI transceiver or the required software), due to the unavailability of a WIFI network, or due to the unavailability of a WIFI network that meets the subscriber's needs (e.g., cost, proximity).

In some embodiments, the negotiation server 116 requires one or more specific credentials and authenticating the specific credentials prior to processing a request to negotiate a temporary lease agreement. The negotiation sever 116 authenticates the subscriber credentials with the subscriber's home WSP. Subscriber credentials include, but are not limited to, home WSP information, telephone number, IMEI, current location of the mobile device 102 (e.g., zip code, area code, country code, latitude/longitude coordinates, city, state, province, region, country), duration of the temporary lease agreement (e.g., duration requested by the subscriber, duration requested by the home WSP), credit amount agreed upon between the subscriber and the home WSP (e.g., as part of a service contract; credit is designated only for a temporary lease agreement or a combination of services including the temporary lease agreement; credit is open for any service, overage, or fee), a maximum allotted credit amount for an invoked service including, but not limited to, services rendered under a temporary lease agreement to define a secured charging policy.

The negotiation server 116 receives the subscriber credentials and, at block 608, searches for all available foreign networks 110. As disclosed at block 504 in FIG. 5, the mobile device 102 has already detected all foreign networks operating in the visited location. Accordingly, in some embodiments, at block 610, the negotiation server 116 requests the mobile device 102 via the iMDANM or the subscriber via the computer 120 to provide foreign network information including network identification information, such as name and technology type (e.g., GSM or UMTS). The negotiation server 116 may request this information instead of conducting the search at block 608 or in addition to conducting the search. In some embodiments, the iMDANM or the subscriber provides foreign network information at will and not in response to a request from the negotiation server 116. In some embodiments, the iMDANM is configured to automatically provide any foreign network information found at block 504, for example, when providing subscriber credentials to the negotiation server 116.

At block 612, the negotiation server 116 selects a foreign network 110. At block 614, the negotiation server 116 starts a background process to negotiate a temporary X-SIM application lease agreement between the selected foreign WSP and the home WSP. The subscriber's account is pre-billed by the home WSP to cover switching service charges that the home WSP may be billed for by the foreign WSP. Alternatively, the subscriber's credit amount (e.g., an eWallet) is debited to cover any service charges. In some embodiments, the subscriber is provided the option to change the charging agreement and policies after temporary lease has been initially granted. The foreign WSP and the home WSP sign an X-SIM application lease agreement that includes the payment method and amount that the foreign WSP needs to pay to the home WSP for use of the home WSP's UICC. In some embodiments, the payment method is any NFC-based payment method, such as an NFC-enabled credit card or debit card, a prepaid method. Although the subscriber is being served by the foreign WSP, the subscriber can still invoke all local applications resident on the UICC, such as address book, productivity applications, games, and the like. At block 616, the transaction is completed.

At block 618, the mobile device 102 accesses the foreign network 110 under the temporary lease agreement. In some embodiments, the mobile device 102 is no longer capable of accessing the foreign network 110 after the temporary lease agreement has expired. In some embodiments, the subscriber is warned by the foreign network 110 of the expiration and may be prompted to extend the temporary lease agreement or allow the agreement to expire. In still other embodiments, the subscriber is provided the option to cancel or force early expiration of the temporary lease agreement. In these embodiments, the subscriber may or may not be refunded any fees for the remaining portion of the agreement based upon the charging policies established for the subscriber. The method 600 ends.

In some embodiments, a web access server also resides in the UICC, such that the iMDANM is capable of providing a web-based GUI (Graphical User Interface) to allow the user to configure charging rules (e.g., only allow certain amount to be charged per day or per session, etc.). An exemplary web access server is illustrated in FIG. 7, described below.

Figure 7:
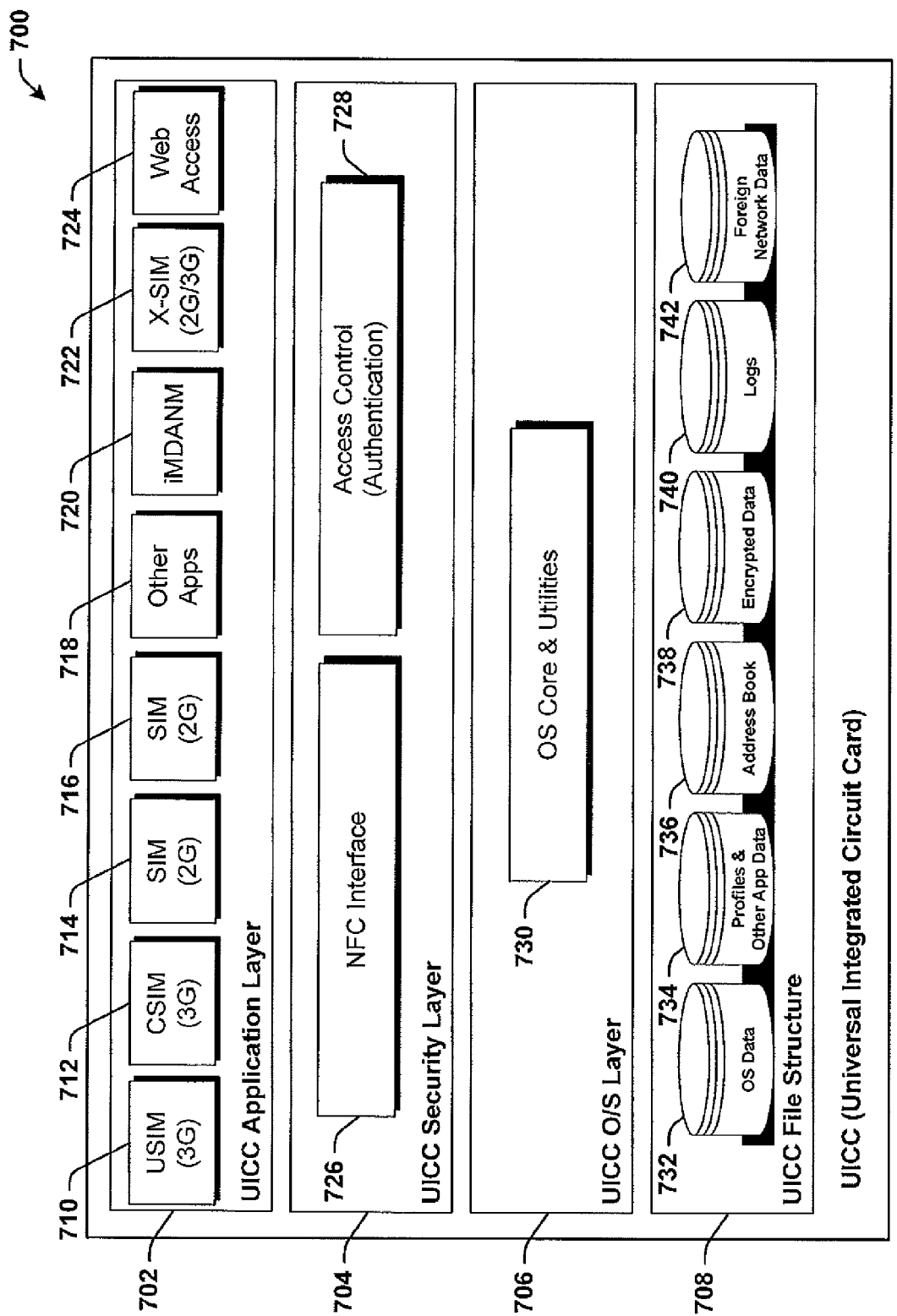
FIG. 7 illustrates certain elements of an exemplary UICC architecture.

FIG. 7 illustrates certain elements of an exemplary UICC architecture 700. The illustrated architecture 700 includes an application layer 702, a security layer 704, an operating system layer 706, and a file structure layer 708. The illustrated application layer 702 include various SIM applications 710, 712, 714, 716 and other applications 718 (e.g., payment applications, address book applications, etc.). The application layer 702 also includes an iMDANM application 720, an X-SIM application 722, and a web access application 724, as described above.

The illustrated security layer 704 includes an NFC interface 726 for providing NFC payment capabilities to the UICC and access control/authentication software for authenticating transactions between the U ICC and an external device or network. The illustrated 0/S layer includes 0/S core and utility applications 730 that provide basic 0/S functionality, utility, and maintenance functions to the UICC, such as memory management, resource management, communication management, application management, or the like, for example.

The illustrated file structure layer 708 includes an O/S data store 732 for storing O/S data used by the O/S core and utility applications 730, a profiles and other application data store 734 for storing user profile data and application data for the applications in the application layer 702, an address book data store 736, an encrypted data store 738 for storing an unlocking code, such as the unlocking code described above, a data logs store 740 for storing data logs including network activity logs, and a foreign network data store 742 for storing data related to any foreign network used under a lease agreement, unlocking agreement, or roaming agreement.

When a UICC-equipped mobile device is sold by the home WSP to a subscriber, several of the illustrated components are provisioned by the home WSP. For example, the SIM applications 710, 712, 714, 716, 718 and other applications, where appropriate, and the iMDANM 720 are provisioned by the home WSP and updated as needed. The X-SIM 722 and the foreign network data store 742 are also provisioned with emptied context and are hidden from the subscriber or foreign WSPs. Certain critical data are encrypted and stored in a secured data region, illustrated as the encrypted data store 738. An unlocking code and/or locking code are also stored in this data store, as described above.

When a subscriber moves outside of a home network coverage area to an area where no roaming partners are available, the iMDANM 720 will offer either a lease agreement option or an unlocking agreement option to the subscriber, as described above with reference to FIG. 5. When negotiations for an agreement succeed, the subscriber is provisioned with the foreign WSP's service option and the mobile device is authenticated by the foreign WSP. The foreign WSP is only given access to write into the X-SIM application 722 and the foreign network data store 742. The foreign WSP cannot access the encrypted data store 738. The subscriber can, however, still invoke any services residing on the UICC that do not require a home WSP's connection for access.

Figure 8:
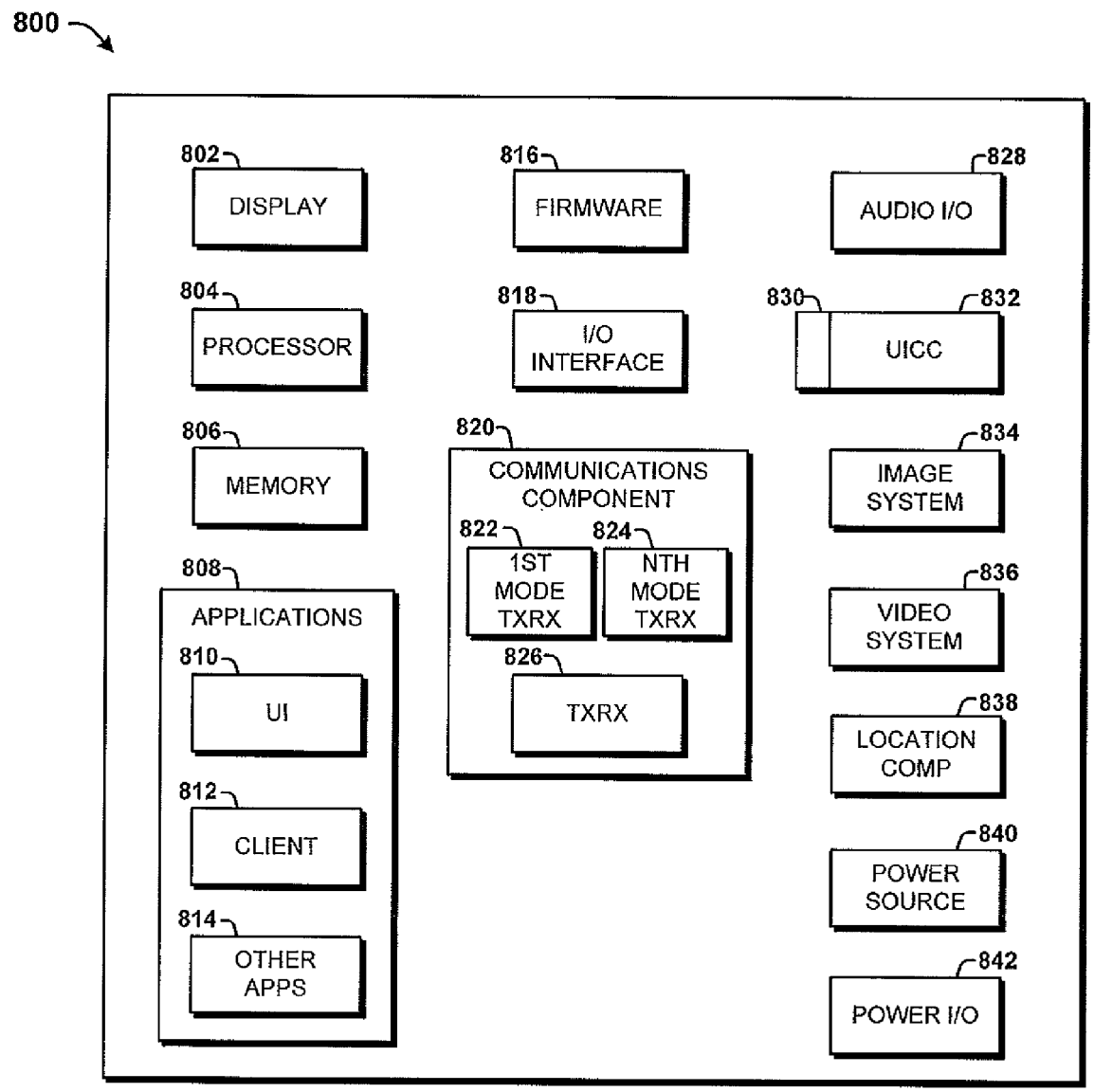
FIG. 8 illustrates an exemplary mobile device and components thereof.

Referring now to FIG. 8, a schematic block diagram of an exemplary mobile device 800 is illustrated. In some embodiments, the mobile device 102 illustrated in FIG. 1 is configured like the mobile device 800, now described in detail. Although connections are not shown between the components illustrated in FIG. 8, the components can interact with each other to carry out device functions. In some embodiments, for example, the components are arranged so as to communicate via one or more busses (not shown). It should be understood that FIG. 8 and the following description are intended to provide a general understanding of a suitable environment in which the various aspects of some embodiments of the present disclosure can be implemented.

In some embodiments, the mobile device 800 is a multi-mode headset and has a variety of computer readable media, including, for example, volatile media, non-volatile media, removable media, and non-removable media. The term computer-readable media and variants thereof, as used in the specification and claims, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 800.

As illustrated in FIG. 8, the mobile device 800 includes a display 802 for displaying multimedia such as, for example, application graphical user interfaces (GUIs), text, images, video, telephony functions, such as Caller ID data, setup functions, menus, voicemail message waiting identifiers (MWIs), music, metadata, messages, wallpaper, graphics, Internet content, device status, preferences settings, map and location data, profile (e.g., vibrate, silent, loud) selection, and the like. The display 802 may display visual voicemail data in visual voicemail headers. The visual voicemail headers may include the date, time, message length, message status (i.e., new-unread, read, saved, or deleted), and calling line identity (CLI) information. The illustrated mobile device 800 also includes a processor 804 for processing data and/or executing computer-executable instructions of one or more applications 808, and a memory 806 for storing data and/or one or more of the applications.

In some embodiments, the application(s) 808 include a user interface (UI) application 810. The UI application 810 interfaces with a client 812 (e.g., an operating system (O/S)) to facilitate user interaction with device functionality and data. In some embodiments, the client 812 is one of Symbian O/S, Microsoft® Windows® Mobile O/S (available from Microsoft Corporation of Redmond, Wash.), Palm® webOS™ (available from Palm Corporation of Sunnyvale, Calif.), Palm®O/S (available from Palm Corporation), RIM® BlackBerry® O/S (available from Research In Motion Limited of Waterloo, Ontario, Canada), Apple® iPhone® O/S (available from Apple Corporation of Cupertino, Calif.), or Google Android™ O/S (available from Google Inc. of Mountain View, Calif.). These operating systems are merely exemplary of the operating systems that may be used in accordance with the embodiments disclosed herein.

The UI application 810 aids a user in entering message content, viewing received messages, managing voicemails in a visual voicemail application, answering/initiating calls, entering/deleting data, entering and setting user IDs and passwords for device access, configuring settings, manipulating address book content and/or settings, multimode interaction, interacting with other applications 814, and the like. In some embodiments, the other applications 814 include, for example, iMDANM software client, visual voicemail applications, messaging applications (e.g., SMS, EMS, MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 808 are stored in the memory 806 and/or in a firmware 816, and are executed by the processor 804. The firmware 816 may also store code for execution during device 800 power up, for example.

The illustrated mobile device 800 also includes an input/output (I/O) interface 818 for input/output of data, such as, for example, voicemail account information requests, visual voicemail management, location information, presence status information, user IDs, passwords, and application initiation (start-up) requests. In some embodiments, the I/O interface 818 is a hardwire connection, such as, for example, a USB, mini-USB, audio jack, PS2, IEEE 1394, serial, parallel, Ethernet (RJ48) port, RJ11 port, or the like. In some embodiments, the I/O interface 818 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 818 may be used for communications between the mobile device 800 and a network or local device, instead of, or in addition to, a communications component 820.

The communications component 820 interfaces with the processor 804 to facilitate wired/wireless communications with external systems. Example external systems include, but are not limited to, intranets, network databases, network storage systems, cellular networks, location servers, presence servers, Voice over Internet Protocol (VoIP) networks, local area networks (LANs), wide area networks (WANs), metropolitan area networks (MANS), personal area networks (PANS), and other networks. In some embodiments, the external systems are implemented using WIFI, WIMAX, combinations and/or improvements thereof, and the like. In some embodiments, the communications component 820 includes a multimode communications subsystem for providing cellular communications via different cellular technologies. In some embodiments, for example, a first cellular transceiver 822 operates in one mode, such as, GSM, and an Nth cellular transceiver 824 operates in a different mode, such as UMTS. While only two cellular transceivers 822, 824 are illustrated, it should be appreciated that a plurality of transceivers can be included.

The illustrated communications component 820 also includes an alternative communications transceiver 826 for use by other communications technologies such as, for example, WIFI, WIMAX, BLUETOOTH, infrared, IRDA, NFC, RF, and the like. In some embodiments, the communications component 820 also facilitates reception from terrestrial radio networks, digital satellite radio networks, Internet-based radio services networks, combinations thereof, and the like.

The communications component 820 processes data from a network such as, for example, the Internet, an intranet (e.g., business intranet), a home broadband network, a WIFI hotspot, and the like, via an ISP, DSL provider, or broadband provider. In some embodiments, the communications component 820 facilitates the transmission of authentication information from the mobile device 800 to a network for processing in accordance with the methods described herein.

Audio capabilities for the mobile device 800 can be provided by an audio I/O component 828 that includes a speaker for the output of audio signals and a microphone to collect audio signals.

The illustrated mobile device 800 also includes a slot interface 830 for accommodating a UICC 832. Alternatively, the UICC 832 may be manufactured into the device 800, thereby obviating the need for a slot interface 830. In some embodiments, the UICC 832 is programmed by a manufacturer, a retailer, a user, a computer, a network operator, or the like. In some embodiments, the UICC 832 is configured to store an iMDANM application. In some embodiments, the UICC 832 is configured to store an X-SIM application.

The illustrated mobile device 800 also includes an image capture and processing system 834 (image system). Photos may be obtained via an associated image capture subsystem of the image system 834, for example, a camera. The illustrated mobile device 800 also includes a video system 836 for capturing, processing, recording, modifying, and/or transmitting video content. Photos and videos obtained using the image system 834 and the video system 836, respectively, may be added as message content to an MMS message and sent to another mobile device.

The illustrated mobile device 800 also includes a location component 838 for sending and/or receiving signals such as, for example, GPS data, assisted GPS (A-GPS) data, WIFI/WIMAX and/or cellular network triangulation data, combinations thereof, and the like, for determining a location of the mobile device 800. In some embodiments, the location component 838 interfaces with cellular network nodes, telephone lines, satellites, location transmitters and/or beacons, wireless network transmitters and receivers, for example, WIFI hotspots, radio transmitters, combinations thereof, and the like. Using the location component 838, the mobile device 800 obtains, generates, and/or receives data to identify its location, or transmits data used by other devices to determine the location of the mobile device 800.

The illustrated mobile device 800 also includes a power source 840, such as batteries and/or other power subsystem (AC or DC). The power source 840 can interface with an external power system or charging equipment via a power I/O component 842.

Figure 9:
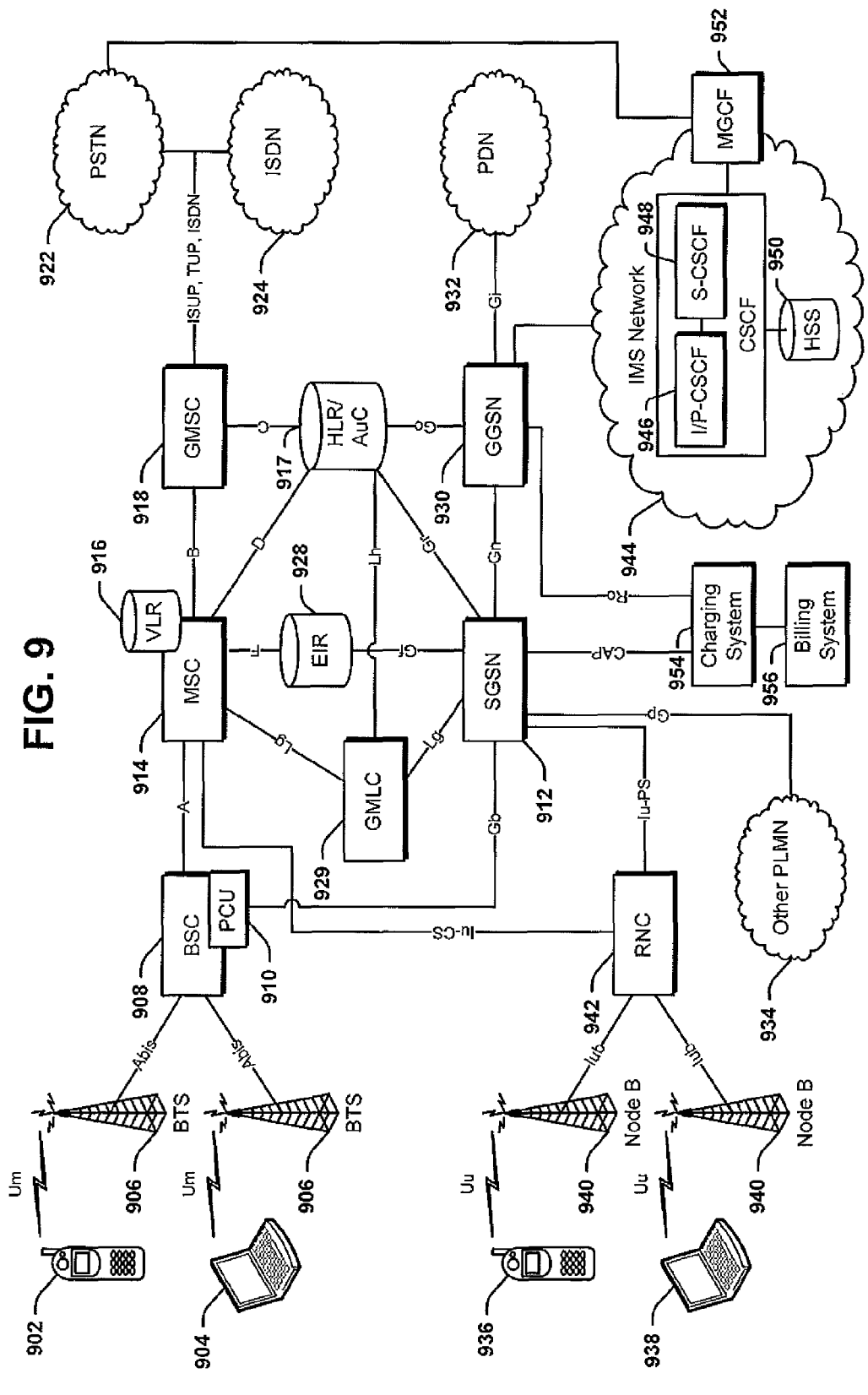
FIG. 9 illustrates an exemplary cellular communications network in which the cellular communications system of FIG. 1 can be implemented.

FIG. 9 illustrates an exemplary cellular communications network 900 that is representative of a home network or a foreign network, for example, the home network 104 and the foreign networks 106, 108, 110 illustrated in FIG. 1. The cellular communications network 900 includes two radio access networks (RANs). A first RAN, illustrated in the upper left hand portion of FIG. 9, is dedicated to GSM-based network access. A second RAN, illustrated in the lower left hand portion of FIG. 9, is dedicated to UMTS-based network access. The innovative aspects of the present disclosure may be implemented in alternative networks that use other access technologies, as described above. The first RAN is now described.

The illustrated communications network 900 includes a first Mobile Station (MS) 902 and a second MS 904 that are each in communication with a Base Transceiver Station (BTS) 906 via the Um radio (air) interface. The BTSs 906 are terminating nodes for the radio interface in the illustrated first RAN. Each BTS 906 includes one or more transceivers and is responsible for ciphering of the radio interface.

In the illustrated embodiment, the first MS 902 is a mobile device, such as the mobile devices 102, 800, and the second MS 904 is a portable computer, such as a laptop with an integrated or external, removable GSM access card or the computer 120. Each MS 902, 904 includes mobile equipment, such as, but not limited to, keyboards, screens, touch screens, multi-touch screens, radio transceivers, circuit boards, processors, memory, a SIM, USIM, or UICC that contains subscriber information to enable network access to the wireless telecommunications network 900, and the like.

Each BTS 906 is in communication with a Base Station Controller (BSC) 908 via the Abis interface. Typically, a BSC has tens or even hundreds of BTSs under its control. The BSC 908 is configured to allocate radio resources to the MSs 902, 904, administer frequencies, and control handovers between BTSs 906 (except in the case of an inter-Mobile Switching Center (MSC) handover in which case control is in part the responsibility of the MSC). One function of the BSC 908 is to act as a concentrator, so that many different low capacity connections to the BTS 906 become reduced to a smaller number of connections towards the MSC. Generally, this means that networks are often structured to have many BSCs 908 distributed into regions near the BTSs 906 which are in turn connected to large centralized MSC sites. Although illustrated as a distinct element, the functions provided by the BSC 908 may alternatively be incorporated in the BTS 906 and, in such a configuration, the Abis interface is eliminated.

The BSC 908 is logically associated with a Packet Control Unit (PCU) 910 when GPRS capabilities are employed. The PCU 910 is configured to support radio related aspects of GPRS when connected to a GSM network. The PCU 910 is in communication with a Serving GPRS Support Node (SGSN) 912 via the Gb interface. The SGSN 912 records and tracks the location of each mobile device (e.g., MSs 902, 904) in the wireless telecommunications network 900. The SGSN 912 also provides security functions and access control functions.

The BSC 908 is also in communication with an MSC 914 via an A interface. The MSC 914 is configured to function as a telecommunications switch. The MSC 914 is in communication with location databases, such as a Visiting Location Register (VLR) 916 and a Home Location Register (HLR) 917. The VLR 916 may be logically associated with the MSC 914 as illustrated or may be provided as a separate network element. The VLR 916 is a database configured to store all subscriber data that is required for call processing and mobility management for mobile subscribers that are currently located in an area controlled by the VLR 916.

The HLR 917 is in communication with the MSC 914 and VLR 916 via the D interface. The HLR 917 is a database configured to provide routing information for mobile terminated calls and various messaging communications. The HLR 917 is also configured to maintain subscriber data that is distributed to the relevant VLR (e.g., the VLR 916) or the SGSN 912 through the attach process and to provide mobility management procedures, such as location area and routing area updates. The HLR 917 may be logically associated with an Authentication Center (AuC) as illustrated or may be provided as a separate network element. The AuC is configured to authenticate each UICC/SIM/USIM/X-SIM that attempts to connect to the wireless telecommunications network 900, for example, when a mobile device is powered on. Once authenticated, the HLR 917 is allowed to manage the UICC/SIM/USIM/X-SIM and services provided to the MS 902, 904. The AuC also is capable of generating an encryption key that is used to encrypt all wireless communications between the MS 902, 904 and the communications network 900.

The MSC 914 is also in communication with a Gateway MSC (GMSC) 918 via the B interface. The GMSC 918 is configured to provide an edge function within a Public Land Mobile Network (PLMN). The GMSC 918 terminates signaling and traffic from a Public Switched Telephone Network (PSTN) 922 and an Integrated Service Digital Network (ISDN) 924, and converts the signaling and traffic to protocols employed by the mobile network. The GMSC 918 is in communication with the HLR/AuC 917 via the C interface to obtain routing information for mobile terminated calls originating from fixed network devices, such as landline telephones that are in communication with the mobile network via the PSTN 922, for example.

The MSC 914 is also in communication with an EIR (Equipment Identity Register) 928 via an F interface. The EIR 928 is a database that can be configured to identify subscriber devices that are permitted to access the wireless telecommunications network 900. An IMEI (International Mobile Equipment Identity) is a unique identifier that is allocated to each mobile device and is used to identify subscriber devices in the EIR 928. The IMEI includes a type approval code, a final assembly code, a serial number, and a spare digit. An IMEI is typically placed in the EIR 928 once its operation has been certified for the infrastructure of the network 900 in a laboratory or validation facility.

The SGSN 912 and the MSC 914 are also in communication with a gateway mobile location center (GMLC) 929 via an Lg interface. The GMLC 929 can communicate with the HLR/AUc 917 via an Lh interface to acquire routing information.

The EIR 928 and the HLR/AuC 917 are each in communication with the SGSN 912 via the Gf interface and the Gr interface, respectively. The SGSN 912, in turn, is in communication with a GGSN (Gateway GPRS Support Node) 930 via the Gn interface. The GGSN 930 is configured to provide an edge routing function within a GPRS network to external PDNs (Packet Data Networks) 932, such as the Internet and one or more intranets, for example. The GGSN 930 is in communication with the PDN 932 via the Gi interface. The GGSN 930 includes firewall and filtering functionality. The HLR/AuC 917 is in communication with the GGSN 930 via the Gc interface.

The SGSN 912 is also in communication with another PLMN 934 via an external GGSN (not shown). The external GGSN provides access to the other PLMN 934. The other PLMN 934 may be, for example, a foreign network, such as, a wireless telecommunications network operated by another WSP or the same WSP.

The second RAN, illustrated in the lower left hand portion of FIG. 9, is dedicated to UMTS-based network access and is now described. The illustrated wireless telecommunications network 900 also includes a first UE (User Equipment) 936 and a second UE 938 that are each in communication with a Node B 940 via the Uu radio (air) interface. The Node B 940 is the terminating node for the radio interface in the second RAN. Each Node B 940 includes one or more transceivers for transmission and reception of data across the Uu radio interface. Each Node B 940 is configured to apply the codes to describe channels in a CDMA-based UMTS network. Generally, the Node B 940 performs similar functions for the UMTS network that the BTS 906 performs for the GSM network.

In the illustrated embodiment, the first UE 936 is a mobile phone (e.g., the mobile device 102, 800) and the second UE 938 is a portable computer, such as a laptop with an integrated or external, removable UMTS card or the computer 120. Each UE 936, 938 includes mobile equipment, such as keyboards, screens, touch screens, multi-touch screens, radio transceivers, circuit boards, processors, a UICC or USIM stand-alone that contains subscriber information to enable network access to the wireless telecommunications network 900, and the like. Generally, the UE's 936, 938 perform similar functions in the UMTS network that the MS's 902, 904 perform in the GSM network.

Each Node B 940 is in communication with a Radio Network Controller (RNC) 942 via the Iub interface. The RNC 942 is configured to allocate radio resources to the UE's 136, 138, administer frequencies, and control handovers between Node Bs 940 (and others not shown). Although illustrated as a distinct element, the RNC 942 functions may alternatively be located within the Node Bs 940. In this configuration the Iub interface is eliminated. Generally, the RNC 942 performs similar functions for the UMTS network that the BSC 908 performs for the GSM network.

The RNC 942 is in communication with the MSC 914 via an Iu-CS interface. The RNC 942 is also in communication with the SGSN 912 via an Iu-PS interface. The other network elements perform the same functions for the UMTS network as described above for the GSM network.

The communications network 900 also includes an IP Multimedia Subsystem (IMS) network 944. The IMS network 944 includes Call State Control Functions (CSCFs), such as, a Proxy-CSCF (P-CSCF), an Interrogating-CSCF (I-CSCF), and a Serving-CSCF (S-CSCF). A P-CSCF is the first contact point in the IMS network 944 for a UE and routes incoming communications to the I-CSCF. The I-CSCF determines which S-CSCF is serving the communication and routes the communication to that S-CSCF, which performs registration, session control, and application interface functions. The P-CSCF and the I-CSCF are illustrated as a combined IIP-CSCF 946 and the S-CSCF 948 is illustrated as a stand-alone element. Other CSCF configurations are contemplated.

The IMS network 944 also includes a Home Subscriber Server (HSS) 950, which is a master user database that supports the IMS network 944 core network elements. The HSS 950 stores subscription-related information, such as subscriber account details and subscriber profiles, performs authentication and authorization of the user, and provides information about a subscriber's location and IP address. It is similar to the GSM HLR and AuC, described above as the combination HLR/AuC 917.

The IMS network 944 also includes a Media Gateway Control Function (MGCF) 952, which provides call control protocol conversions between the ISUP (ISDN User Part) protocol used by the PSTN 922 and the SIP (Session Initiation Protocol) used by the IMS network 944.

Referring back to the SGSN 912, it is shown that the SGSN 912 is in communication with a charging system 954 via a CAP interface. The GGSN 930 is also in communication with the charging system 954, via an Ro interface. The charging system 954, in turn, is in communication with a billing system 956.

Briefly, the charging system 954 is responsible for offline and online charging of subscriber accounts. The charging system 954 may be deployed to provide charging rule functions for prepaid and/or postpaid network platforms and for agreements developed between a home network WSP and a foreign WSP, such as a temporary lease agreement, a temporary unlocking agreement, or a temporary roaming agreement, as described herein, The single charging system 954 is illustrated for simplicity, however separate charging systems are contemplated and may be utilized if desired by the operating WSP.

As used herein, offline charging generally refers to a charging mechanism where charging information does not affect, in real- or near real-time, the rendered service. As also used herein, online charging generally refers to a charging mechanism where charging information does affect, in real- or near real-time, the rendered service, thus requiring a direct interaction of the charging mechanism with the session/service control. Online charging is used in prepaid applications and real-time provisioning, for example.

The billing system 956 is responsible for billing postpaid customers and handling payments received for service provisioned for both postpaid and prepaid accounts in the network 900. Like the charging system 954, the billing system 956 may alternatively be designed as two separate entities for postpaid and prepaid applications.

As described above, in some embodiments, the charging system 954 provides both online and offline charging functions. As such, in some embodiments, the charging system 954 includes an offline charging system which itself includes a Charging Data Function (CDF) and a Charging Gateway Function (CGF). In some embodiments, the charging system 954 additionally or alternatively includes an online charging system. The online and offline charging systems are both operable to transmit Call Detail Records (CDRs) to the billing system 956. The CDRs are generated for subscriber activity within the network 900 or a foreign network in which a mobile device is roaming under an established partner roaming agreement. In some embodiments, CDRs are received from a foreign network that has established a temporary agreement for roaming, unlocking, and/or leasing, as described herein.

The offline charging system communicates with one or more of the following elements or functions to receive charging information: a circuit-switched network element, such as those illustrated and described above in the circuit-switched portion of the network 900, a service network element, a SIP application server, a Multimedia Resource Function Control (MRFC), the MGCF 952, a Break-out Gateway Control Function (BGCF), a P-CSCF/I-CSCF, a S-CSCF, a Wireless Local Area Network (WLAN), the SGSN 912, and the GGSN 930. These and the other illustrated elements are described in detail in the 3GPP technical specifications.

The online charging system includes online charging functions, such as a session-based charging function, an event-based charging function, and/or a volume-based charging function. A charging gateway function is in communication with the online charging system via a Ga interface and to a post-processing system via a Bo interface. The post-processing system, in some embodiments, is a billing system, such as the billing system 956. A rating function is in communication with the online charging functions via a Re interface. The rating function includes tariff information including, for example, all the purchase values for the various goods and services provided by a WSP.

A charging trigger function is in communication with the offline charging system and the online charging system via an Rf interface and an Ro interface, respectively. The charging trigger function may be implemented into any of the previously described service elements and may be configured to trigger a charging routine for a particular service or good.

The offline charging system includes a charging data function that is in communication with a charging gateway function via a Ga interface. The online charging system includes an online charging function that is in communication with an account balance management function, a rating function, and a charging gateway function. The charging gateway functions are in communication with the billing system 956 via a Bx or Bo interface.

An offline charging gateway function is in communication with an offline rating function that may be stored within the billing system 956. The offline rating function is responsible for rating services for postpaid subscribers when the postpaid subscriber's bill is to reflect any charges the customer incurs during the billing period, such as those incurred within the subscriber's home network or a visited foreign network. Each of the charging gateway functions includes call detail records or more broadly termed, charge detail records to reflect all charges not just voice call charges. Although the online and offline gateway functions and rating functions are described as separate elements, a combined architecture is also contemplated.

The billing system 956 includes the offline rating function that is in communication with the offline charging gateway function via a Bx interface. The offline rating function is in communication with a rate plans database that is configured to store and manage rate plans for postpaid subscription services. The rate plans database is in communication with a call center, Interactive Voice Response (IVR) system and/or other customer care systems to facilitate customer service functions regarding rate plans for voice and/or data services. The offline rating function is also in communication with a bill calculator that is provided to calculate postpaid bills and process invoices to be sent via email, mail, or another method to a postpaid subscriber at the end of a billing period. A prepaid accounts database may also be provided to maintain prepaid subscriber accounts, such as by monitoring minute and data block allocations for a subscriber account and instructing the network 900 to no longer allow a subscriber to access the network 900 when that subscriber's minute and/or data block allocation, as appropriate, has reached a zero balance.

Other network elements that are not shown may be incorporated into the illustrated network 900 to facilitate various features described herein. For example, a call center and/or an IVR (Interactive Voice Response) may be used to offer customer care services, such as account setup, account activation, account closure, account contact information updates, balance inquiries, prepaid deposits, bill-pay, and like services via a human operator and automated system, respectively. The call center and/or IVR may be in communication with external circuit-switched networks, such as the PSTN 922 and/or the ISDN 924 or may be in direct communication with the MSC 914.

A PoS (Point-of-Sale) system may also be incorporated into the illustrated network 900. The PoS system may operate at a physical store (or other location) or through an Internet web site. The POS system allows a subscriber to purchase services and mobile devices.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for providing cellular access to a mobile device, comprising:
    detecting, by a processor within the mobile device, foreign networks available at a location of the mobile device, wherein a home network operated by a home wireless service provider is not accessible at the location of the mobile device;
    determining, by the processor, that none of the detected foreign networks are roaming partners of the home wireless service provider;
    providing a user of the mobile device with an option to initiate a process to establish a lease agreement between the home wireless service provider and a foreign wireless service provider to lease a portion of a universal integrated circuit card of the mobile device, provided by the home wireless service provider, to the foreign wireless service provider for provisioning service credentials to provide the mobile device with cellular access to a foreign network operated by the foreign wireless service provider;
    responsive to receiving a selection of the option via a user interface of the mobile device, providing subscriber credentials to a web application associated with a negotiation server to authenticate a subscriber for the lease agreement, wherein the subscriber credentials include a lease duration requested by the subscriber and wherein the negotiation server, which is a third party server not affiliated with any foreign network, selects a foreign network among the foreign networks detected to be available in the location of the mobile device and negotiates the lease agreement, including charging policies, between the home wireless service provider and a foreign wireless service provider of the selected foreign network to lease the portion of the universal integrated circuit card to provide the mobile device with cellular access to the selected foreign network.

2. The method of claim 1, further comprising:
    receiving, at the processor of the mobile device, the service credentials provided by the selected foreign network;
    applying the service credentials to the leased portion of the universal integrated circuit card; and
    allowing the mobile device to access the selected foreign network.

3. The method of claim 1, wherein the subscriber credentials include a credential selected from a group of credentials consisting of: home wireless service provider identification information, a telephone number of the mobile device, a universal integrated circuit card serial number, a current location of the mobile device, a duration of the lease agreement, and a maximum allotted credit amount.

4. The method of claim 3, wherein allowing the mobile device to access the selected foreign network comprises allowing the mobile device to access the selected foreign network for the duration of the lease agreement as specified in the subscriber credentials or the service credentials.

5. The method of claim 3, wherein at least some of the subscriber credentials are pre-loaded into the mobile device by the home wireless service provider.

6. The method of claim 1, further comprising:
providing the user of the mobile device with another option to initiate a process to establish an unlocking agreement between the home wireless service provider and the foreign wireless service provider to provide the mobile device with cellular access to the foreign network operated by the foreign wireless service provider; and
responsive to receiving a selection of the other option via the user interface of the mobile device, providing subscriber credentials to the home wireless service provider to authenticate the subscriber for unlocking the mobile device, wherein the home wireless service provider provides a communication to the mobile device for unlocking the mobile device to provide the mobile device with cellular access to the selected foreign network.

7. The method of claim 6, further comprising, responsive to receiving the selection of the other option via the user interface of the mobile device, receiving a prompt from the home wireless service provider for the subscriber to select a method by which to receive the communication from the home wireless service provider for unlocking the mobile device.

8. The method of claim 1, wherein the subscriber credentials include a credit amount agreed upon between the subscriber and the home wireless service provider.

9. The method of claim 1, wherein the charging policies include charging policies requested by the subscriber.

10. The method of claim 1, further comprising providing the subscriber with an option to change the lease agreement.

11. A mobile device, comprising:
a processor; and
a memory containing instructions which, when executed by the processor, cause the processor to perform operations comprising:
detecting foreign networks available at a location of the mobile device, wherein a home network operated by a home wireless service provider is not accessible at the location of the mobile device;
determining that none of the detected foreign networks are roaming partners of the home wireless service provider;
providing a user of the mobile device with an option to initiate a process to establish a lease agreement between the home wireless service provider and a foreign wireless service provider to lease a portion of a universal integrated circuit card of the mobile device, provided by the home wireless service provider, to the foreign wireless service provider for provisioning service credentials to provide the mobile device with cellular access to a foreign network operated by the foreign wireless service provider;
responsive to receiving a selection of the option via a user interface of the mobile device, providing subscriber credentials to a web application associated with a negotiation server to authenticate a subscriber for the lease agreement, wherein the subscriber credentials include a lease duration requested by the subscriber and wherein the negotiation server, which is a third party server not affiliated with any foreign network, selects a foreign network among the foreign networks detected to be available in the location of the mobile device and negotiates the lease agreement, including charging policies, between the home wireless service provider and a foreign wireless service provider of the selected foreign network to lease the portion of the universal integrated circuit card to provide the mobile device with cellular access to the selected foreign network.

12. The mobile device of claim 11, wherein the memory further contains instructions which, when executed by the processor, cause the processor to:
receive the service credentials provided by the selected foreign network;
apply the service credentials to the leased portion of the universal integrated circuit card; and
allow the mobile device to access the selected foreign network.

13. The mobile device of claim 11, wherein the subscriber credentials include a credential selected from a group of credentials consisting of: home wireless service provider identification information, a telephone number of the mobile device, a universal integrated circuit card serial number, a current location of the mobile device, a duration of the lease agreement, and a maximum allotted credit amount.

14. The mobile device of claim 13, wherein the instructions which, when executed by the processor, allow the mobile device to access the selected foreign network allow the mobile device to access the selected foreign network for the duration of the lease agreement as specified in the subscriber credentials or the service credentials.

15. The method of claim 13, wherein at least some of the subscriber credentials are pre-loaded into the memory by the home wireless service provider.

16. A computer-readable storage device having stored thereon instructions which, when executed by a processor, cause the processor to perform operations comprising:
detecting foreign networks available at a location of a mobile device, wherein a home network operated by a home wireless service provider is not accessible at the location of the mobile device;
determining that none of the detected foreign networks are roaming partners of the home wireless service provider;
providing a user of the mobile device with an option to initiate a process to establish a lease agreement between the home wireless service provider and a foreign wireless service provider to lease a portion of a universal integrated circuit card of the mobile device, provided by the home wireless service provider, to the foreign wireless service provider for provisioning service credentials to provide the mobile device with cellular access to a foreign network operated by the foreign wireless service provider;
responsive to receiving a selection of the option via a user interface of the mobile device, providing subscriber credentials to a web application associated with a negotiation server to authenticate a subscriber for the lease agreement, wherein the subscriber credentials include a lease duration requested by the subscriber and wherein the negotiation server, which is a third party server not affiliated with any foreign network, selects a foreign network among the foreign networks detected to be available in the location of the mobile device and negotiates the lease agreement, including charging policies, between the home wireless service provider and a foreign wireless service provider of the selected foreign network to lease the portion of the universal integrated circuit card to provide the mobile device with cellular access to the selected foreign network.

17. The computer-readable storage device of claim 16, further having stored thereon instructions which, when executed by the processor, cause the processor to:
    receive the service credentials provided by the selected foreign network;
    apply the service credentials to the leased portion of the universal integrated circuit card; and
    allow the mobile device to access the selected foreign network.

18. The computer-readable storage device of claim 16, wherein the subscriber credentials include a credential selected from a group of credentials consisting of: home wireless service provider identification information, a telephone number of the mobile device, a universal integrated circuit card serial number, a current location of the mobile device, a duration of the lease agreement, and a maximum allotted credit amount.

19. The computer-readable storage device of claim 18, wherein the instructions which, when executed by the processor, allow the mobile device to access the selected foreign network allow the mobile device to access the selected foreign network for the duration of the lease agreement as specified in the subscriber credentials or the service credentials.

* * * * *